E. FETTER.
VULCANIZING APPARATUS AND PROCESS.
APPLICATION FILED NOV. 13, 1918.
1,312,029.
Patented Aug. 5, 1919.
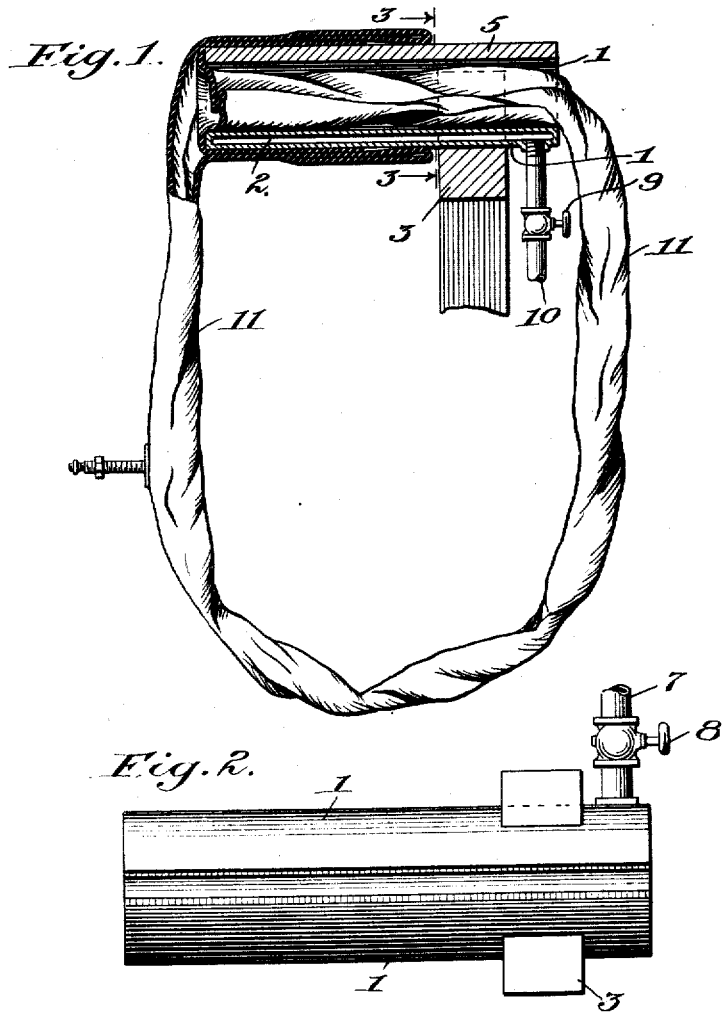
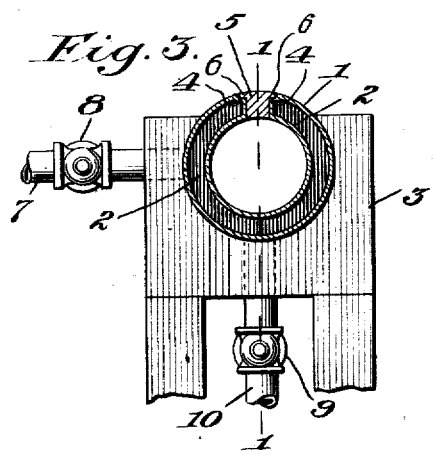
Inventor:
Edward Fetter.
Hosea B. Moulton.
Att'y.

UNITED STATES PATENT OFFICE.

EDWARD FETTER, OF BALTIMORE, MARYLAND.

VULCANIZING APPARATUS AND PROCESS.

1,312,029.  Specification of Letters Patent.  Patented Aug. 5, 1919.

Application filed November 13, 1918. Serial No. 262,351.

*To all whom it may concern:*

Be it known that I, EDWARD FETTER, a citizen of the United States, residing at Baltimore, State of Maryland, have invented certain new and useful Improvements in Vulcanizing Apparatus and Process, of which the following is a specification.

My invention relates to improvements in vulcanizing apparatus and process, and it consists in the combinations, constructions and arrangements herein described and claimed, and in the steps hereinafter set forth.

An object of my invention is to provide a device by means of which the ends of inner tubes of pneumatic tires may be "spliced," *i. e.*, joined together quickly and economically by vulcanizing the ends instead of merely cementing them, by the use of acid or other cementing agencies.

A further object of my invention is to provide a vulcanizing device consisting of a hollow cylinder over one end of which a tube may be turned back upon itself, so as to bring the outer side of the tube next to the vulcanizing surface of the cylinder, the latter being supplied with heat for carrying out the vulcanizing process.

A further object of my invention is to provide a device which will readily permit the tube to be forced into operative relation with the vulcanizing surface, and from which the tube may be easily removed.

A further object of my invention is to provide a process by means of which the tube may be placed on the vulcanizer and will grip the vulcanizer tightly, thus dispensing with the need of a clamp, or other holding device, the subsequent steps of the process causing the tube to release its grip and to force itself off from the vulcanizer.

Other objects and advantages will appear in the following specification, and the novel features of the invention will be particularly pointed out in the appended claims.

My invention is illustrated in the accompanying drawings, forming part of this application, in which—

Figure 1 is a longitudinal section through the vulcanizer and through a portion of the inner tube, the major portion of the tube being shown in elevation;

Fig. 2 is a plan view of the vulcanizing device; and

Fig. 3 is a transverse section through the vulcanizer on the line 3—3 of Fig. 1.

In "splicing" the ends of inner tubes of pneumatic tires, *i. e.*, in joining the ends together, the ordinary method is to make use of some cementing agent, such as the well-known acid cement, instead of vulcanizing the joint, because of the fact that heretofore no device has been in use for successfully and economically forming the joint. The result has been that when these tubes are used in tires which are subjected to great heat, as for instance in the tires of racing automobiles, the heat will cause the joint to loosen, thus destroying the utility of the tire. The present invention is designed to vulcanize the joint so as to afford a perfect splicing of the tube ends.

In carrying out my invention I provide a hollow metal cylinder 1, having double walls to provide a steam space 2. The cylinder is designed to be held rigidly in position by any suitable means, such as the support 3. As will be seen from the drawings, the ends of the steam space are closed. The cylinder is provided with a longitudinal slot, the walls of this slot being continued across the steam space, as shown in Fig. 3, so as to prevent the escape of steam. Near the outer side of the cylinder at each side of the slot are shoulders 4. A bar 5 having flanges 6 arranged to rest on the shoulders 4 is provided, the outer and inner surfaces of the bar being curved to conform with the outer and inner surfaces of the cylinder, and being flush therewith when the bar is in position. A suitable steam inlet 7 is provided, a valve 8 controlling the inlet, while a valve 9 controls an outlet 10.

From the foregoing description of the various parts of the device, the operation thereof may be readily understood. The cylinder 1 is slightly larger in diameter than the diameter of the tube 11, whose ends are to be spliced. It is, therefore, necessary to admit compressed air into the tube before placing it in position on the vulcanizer. Before doing this, however, the bar 5 is removed from the slot by pulling it outwardly, and the deflated tube whose ends have been previously treated with cementing material and placed in position to form the joint, is passed through the slot after which the bar is replaced in position. The tube is now pumped up as stated, so that the portion of the tube at which the joint is located, may be forced over one end of the vulcanizing cylinder, thereby bringing the outer surface of the tube and joint next to the outer surface of the cylinder. The air is now let out of the tube and the latter, on contracting, will cling tightly to the surface of the vulcanizer, and will not require any additional clamping means for holding it close to the vulcanizing surface during the process of vulcanizing.

Fig. 1 shows the position of the parts at this stage of the operation. It is now only necessary to admit steam to the steam space 2 in order to supply the heat necessary for the vulcanizing action. The time for vulcanizing depends upon the composition of the tube. I contemplate using a battery of vulcanizing cylinders of such a number that the time taken to fit the tubes on the cylinders will be substantially the time taken to vulcanize the tube on the first cylinder. This may vary from five to fifteen minutes more or less.

When the joint has been vulcanized it is only necessary to admit compressed air to the tube, when the latter will force itself off from the end of the tube. The result is a joint or splice which is vulcanized as well as any portion of the tube. In the drawings, the end of one section of the tube may be seen in place on the vulcanizer, but in the finished joint there is no line to show where the splice has been made.

While I have shown a cylinder of a certain size and supported in a certain manner in the drawings, it will be understood that the cylinders are to be made in various sizes and may be supported in any suitable manner without departing from the spirit and the scope of the invention.

I claim:

1. A vulcanizing device comprising a hollow cylinder having double walls to provide a steam space, and a slot to permit the entrance of a rubber tube, a closure for the slot having flanges arranged to engage the walls of the slot for positioning the closure, said closure being movable into and out of position in the slot in a radial direction, and the outer and inner faces of the closure forming a continuation of the outer and inner faces of the cylinder, and being flush therewith throughout the length of the cylinder.

2. The herein described steps of vulcanizing a joint of a rubber tube on a hollow heated cylinder which consist in admitting compressed air into the tube to expand the same, and subsequently forcing the portion of the tube containing the joint back upon itself and over the outer surface of the cylinder to bring the outer surface of the joint next to the surface of the cylinder.

3. The herein described steps in a process of vulcanizing a joint of a rubber tube on a hollow heated cylinder which consists in forcing the portion of the tube containing the joint back upon itself and over the outer surface of the cylinder to bring the outer surface of the joint next to the surface of the cylinder, heating the cylinder, and subsequently forcing compressed air into the tube whereby the tube is forced out from the cylinder.

4. The herein described process of vulcanizing a joint of a rubber tube on a hollow heated cylinder, which consists in admitting compressed air into the tube, forcing the portion of the tube containing the joint back upon itself and over the outer surface of the cylinder to bring the outer surface of the joint next to the surface of the cylinder, releasing the air from the tube whereby the latter is caused to grip the surface of the cylinder, heating the cylinder, and subsequently forcing compressed air into the tube whereby the tube is forced off from the cylinder.

In testimony whereof I affix my signature.

EDWARD FETTER.

Witnesses:
 CAROLINE E. DUNIGAN,
 WILLIAM FETTER.